(12) United States Patent
Shin et al.

(10) Patent No.: US 10,184,372 B2
(45) Date of Patent: Jan. 22, 2019

(54) EXHAUST SYSTEMS AND METHODS FOR GAS TURBINE ENGINE

(71) Applicant: HONEYWELL INTERNATIONAL INC., Morris Plains, NJ (US)

(72) Inventors: Yoonshik Shin, Chandler, AZ (US); Yogendra Yogi Sheoran, Scottsdale, AZ (US); Daniel Brown, Surprise, AZ (US)

(73) Assignee: HONEYWELL INTERNATIONAL INC., Morris Plains, NJ (US)

( * ) Notice: Subject to any disclaimer, the term of this patent is extended or adjusted under 35 U.S.C. 154(b) by 331 days.

(21) Appl. No.: 15/161,581

(22) Filed: May 23, 2016

(65) Prior Publication Data
US 2017/0335728 A1    Nov. 23, 2017

(51) Int. Cl.
| | |
|---|---|
| *F01N 1/08* | (2006.01) |
| *F02C 7/14* | (2006.01) |
| *F02K 1/38* | (2006.01) |
| *F01N 3/05* | (2006.01) |
| *F01D 25/30* | (2006.01) |

(52) U.S. Cl.
CPC ............. *F01N 1/083* (2013.01); *F01D 25/30* (2013.01); *F01N 3/05* (2013.01); *F02C 7/14* (2013.01); *F02K 1/386* (2013.01); *F05D 2220/32* (2013.01)

(58) Field of Classification Search
CPC .... F01N 1/083; F01N 3/05; F02C 7/14; F02C 7/045; F02K 1/386; F01D 25/30
USPC .......................... 181/213, 215, 220
See application file for complete search history.

(56) References Cited

U.S. PATENT DOCUMENTS

| | | | | |
|---|---|---|---|---|
| 2,845,775 | A * | 8/1958 | Meyer | F02K 1/42 |
| | | | | 181/215 |
| 3,587,778 | A | 6/1971 | Ellis | |
| 4,292,803 | A * | 10/1981 | Prior | F02K 1/386 |
| | | | | 239/265.37 |
| 4,645,032 | A | 2/1987 | Ross et al. | |
| 4,747,467 | A | 5/1988 | Lyon et al. | |
| 6,615,576 | B2 | 9/2003 | Sheoran et al. | |
| 7,364,117 | B2 * | 4/2008 | Dionne | B64D 33/08 |
| | | | | 244/58 |
| 7,482,705 | B2 | 1/2009 | Piercey, III | |
| 8,235,170 | B1 * | 8/2012 | Ertz | F01D 25/305 |
| | | | | 181/213 |

(Continued)

FOREIGN PATENT DOCUMENTS

GB          332643 A      7/1930

OTHER PUBLICATIONS

Extended EP Search Report for Application No. 17168079.6-1607 dated Sep. 28, 2017.

*Primary Examiner* — Jeremy Luks
(74) *Attorney, Agent, or Firm* — Lorenz & Kopf, LLP

(57) ABSTRACT

Systems and methods for an exhaust system for a gas turbine engine are provided. The exhaust system includes an eductor system adapted to receive a primary exhaust fluid. The eductor system includes a body that extends along a first axis, with a plurality of ducts spaced apart about a circumference of the body. Each of the plurality of ducts extend from the body along a second axis transverse to the first axis to define a plurality of eductor primary flow paths that terminate in a mixing chamber. The mixing chamber is adapted to receive a secondary cooling fluid and to mix the primary exhaust fluid with the secondary cooling fluid to create a mixed fluid flow.

13 Claims, 6 Drawing Sheets

(56) References Cited

U.S. PATENT DOCUMENTS

2005/0274117 A1   12/2005   Sheoran et al.

* cited by examiner

EXHAUST SYSTEMS AND METHODS FOR GAS TURBINE ENGINE

TECHNICAL FIELD

The present disclosure generally relates to gas turbine engines, and more particularly relates to an exhaust system and method for a gas turbine engine.

BACKGROUND

Gas turbine engines may be employed to power various devices. For example, a gas turbine engine may be employed to supply power to a mobile platform, such as an aircraft. In certain examples, the gas turbine engine is an auxiliary power unit, which can supply power to run various electrical systems of the aircraft. Certain electrical systems are supplied by a generator, through a gearbox driven by the gas turbine engine. As needs for power increase, heat output by the generator into a compartment of the gas turbine engine may increase and a temperature of the lubricating fluid associated with the gearbox may also increase. Moreover, in certain instances, the auxiliary power unit can run while the aircraft is on the ground, prior to taxiing for flight. In these instances, noise generated by the auxiliary power unit may be undesirable to one or more passengers or crew onboard the aircraft and service personnel outside.

Accordingly, it is desirable to provide improved exhaust systems and methods for a gas turbine engine, such as an auxiliary power unit, which provides for increased cooling of a compartment of the gas turbine engine, increased cooling of a lubrication fluid, and that attenuates sound generated by the operation of the gas turbine engine. Furthermore, other desirable features and characteristics of the present invention will become apparent from the subsequent detailed description and the appended claims, taken in conjunction with the accompanying drawings and the foregoing technical field and background.

SUMMARY

The various teachings of the present disclosure provide an exhaust system for a gas turbine engine. The exhaust system includes an eductor system adapted to receive a primary exhaust fluid. The eductor system includes a body that extends along a first axis, with a plurality of ducts spaced apart about a circumference of the body. Each of the plurality of ducts extend from the body along a second axis transverse to the first axis to define a plurality of eductor primary flow paths that terminate in a mixing chamber. The mixing chamber is adapted to receive a secondary cooling fluid and to mix the primary exhaust fluid with the secondary cooling fluid to create a mixed fluid flow.

Further provided is a method for attenuating sound generated by a gas turbine engine with an exhaust system. The method includes: receiving a primary exhaust fluid in a primary manifold; receiving a secondary cooling fluid in a secondary plenum; directing the primary exhaust fluid through a plurality of eductor primary flow paths associated with a respective plurality of ducts spaced circumferentially about a primary manifold, the plurality of eductor primary flow paths extending through the secondary plenum; and mixing the primary exhaust fluid and the secondary cooling fluid in a mixing chamber associated with a respective one of the plurality of ducts to create a mixed fluid flow.

Also provided is an exhaust system for a gas turbine engine. The exhaust system includes an eductor system adapted to receive a primary exhaust fluid. The eductor system includes a plurality of ducts spaced apart about a circumference of the eductor system, with each of the plurality of ducts including a plurality of eductor primary flow paths that terminate in a mixing chamber. The mixing chamber is adapted to receive a secondary cooling fluid and to mix the primary exhaust fluid with the secondary cooling fluid to create a mixed fluid flow. The exhaust system includes a muffler system downstream from the mixing chamber adapted to receive the mixed fluid flow from the eductor system. The muffler system includes a plurality of baffles that cooperate to define a tortuous path for the mixed fluid flow and attenuate sound generated by the gas turbine engine.

DESCRIPTION OF THE DRAWINGS

The exemplary embodiments will hereinafter be described in conjunction with the following drawing figures, wherein like numerals denote like elements, and wherein.

DETAILED DESCRIPTION

The following detailed description is merely exemplary in nature and is not intended to limit the application and uses. Furthermore, there is no intention to be bound by any expressed or implied theory presented in the preceding technical field, background, brief summary or the following detailed description. In addition, those skilled in the art will appreciate that embodiments of the present disclosure may be practiced in conjunction with any type of gas turbine engine that would benefit from an exhaust system and method that attenuates the sound generated by the gas turbine engine, and that the gas turbine engine described herein as an auxiliary power unit is merely one exemplary embodiment according to the present disclosure. Moreover, while the exhaust system and method is described herein as being used with a gas turbine engine onboard a mobile platform or vehicle, such as a bus, motorcycle, train, motor vehicle, marine vessel, aircraft, rotorcraft and the like, the various teachings of the present disclosure can be used with a gas turbine engine associated with a stationary platform. Further, it should be noted that many alternative or additional functional relationships or physical connections may be present in an embodiment of the present disclosure. In addition, while the figures shown herein depict an example with certain arrangements of elements, additional intervening elements, devices, features, or components may be present in an actual embodiment. It should also be understood that the drawings are merely illustrative and may not be drawn to scale.

Figure 1:
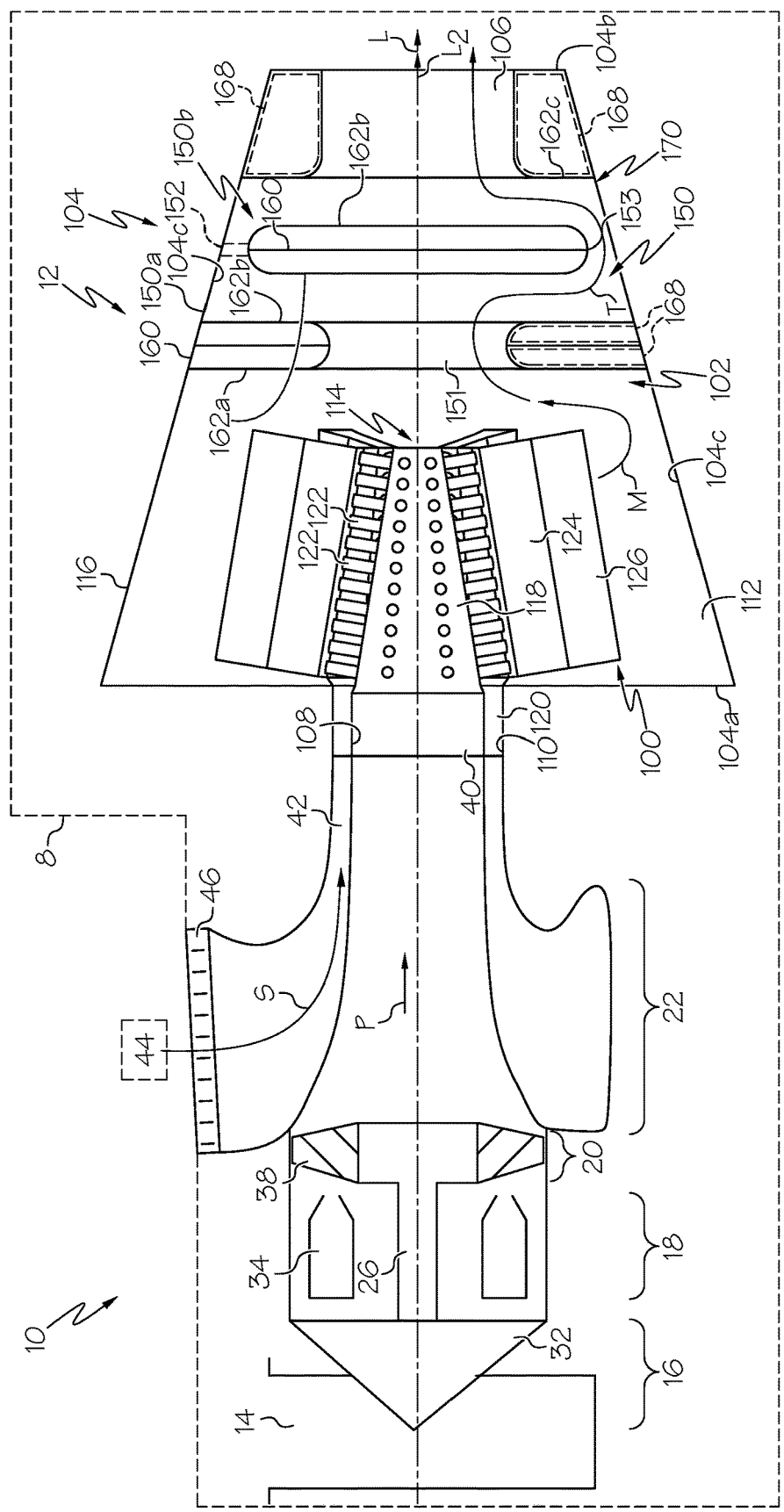
FIG. 1 is a schematic cross-sectional illustration of a gas turbine engine including an exhaust system according to various embodiments.

With reference to FIG. 1, a simplified cross-sectional view of an exemplary gas turbine engine 10 is shown, which includes an exhaust system 12 according to various embodiments. In this example, the gas turbine engine 10 is employed with a mobile platform, such as an aircraft 8, and in certain embodiments, the gas turbine engine 10 comprises an auxiliary power unit (APU) for the aircraft 8. It should be noted that while the exhaust system 12 is discussed herein with regard to the gas turbine engine 10, the exhaust system 12 can be employed with any suitable engine, such as a turbojet engine, etc. Thus, the following description is merely one exemplary use of the exhaust system 12. Moreover, while the gas turbine engine 10 is described herein as being used with the aircraft 8, it will be understood that the gas turbine engine 10 may be used with any suitable platform, whether mobile or stationary.

In this example, the gas turbine engine 10 includes an intake section 14, a compressor section 16, a combustor section 18, a turbine section 20, and an exhaust section 22 in fluid communication with the exhaust system 12. The intake section 14 includes an inlet duct for receiving air from a source, such as a source external to the aircraft 8. A shaft 26 defines an axis of rotation for the gas turbine engine 10, which also comprises a longitudinal axis L of the gas turbine engine 10.

The compressor section 16 includes a compressor 32, which is coupled to the shaft 26. However, in other embodiments, the number of compressors in the compressor section 16 may vary. In the depicted embodiment, the rotation of the shaft 26 drives the compressor 32, which draws in air from the inlet duct of the intake section 14. The compressor 32 raises the pressure of the air and directs majority of the high pressure air into the combustor section 18.

The combustor section 18 includes an annular combustor 34, which receives the compressed air from the compressor 32, and also receives a flow of fuel from a non-illustrated fuel source via a fuel metering valve (not shown). The fuel and compressed air are mixed within the combustor 34, and are combusted to produce relatively high-energy combustion gas. The combustor 34 can be any suitable combustor 34, including, but not limited to can-type combustors, various reverse-flow combustors, various through-flow combustors, and various slinger combustors. The relatively high-energy combustion gas that is generated in the combustor 34 is supplied to the turbine section 20.

The turbine section 20 includes a turbine 38. However, it will be appreciated that the number of turbines, and/or the configurations thereof, may vary. The turbine 38 can comprise one of numerous types of turbines including, but not limited to, a vaned radial turbine, a vaneless radial turbine, and a vaned axial turbine. In this embodiment, the high-temperature combusted air from the combustor section 18 expands through and rotates the turbine 38. The air is then exhausted through the exhaust section 22. As the turbine 38 rotates, it drives equipment in the gas turbine engine 10 via a shaft or spool.

The exhaust section 22 includes a primary flow duct 40 and a secondary flow duct 42. The primary flow duct 40 receives the combustion gases from the turbine section 20, and the combustion gases comprise a primary exhaust fluid that constitutes a primary fluid flow P through the exhaust system 12. The secondary flow duct 42 receives a secondary fluid from a source of a secondary fluid 44, which constitutes a secondary cooling fluid flow S through the exhaust system 12. Generally, the secondary fluid has a temperature which is different than a temperature of the primary fluid, and the secondary fluid generally has a lower temperature than the primary fluid, such that the secondary fluid can be mixed with the primary fluid to cool or reduce the temperature of the primary fluid. Thus, the secondary fluid comprises a secondary cooling fluid. In one example, the source of the secondary fluid 44 comprises an inlet duct defined through a fuselage of the aircraft 8; however, the source of the secondary fluid 44 can be provided from other systems onboard the aircraft 8. Generally, the secondary fluid is drawn into the exhaust section 22, and thus, the exhaust system 12 through viscous action. Thus, the secondary fluid can comprise ambient air or air surrounding a fuselage of the aircraft 8.

In one embodiment, the secondary fluid flow S is directed from the source of the secondary fluid 44 over or through an engine and generator oil cooler 46. The engine and generator oil cooler 46 comprises an air-oil cooler, and the secondary fluid flow S is drawn through the engine and generator oil cooler 46 to cool the fluid that lubricates the various components of the gas turbine engine 10. The secondary fluid flow S also cools a compartment that contains the gas turbine engine 10.

Figure 2:
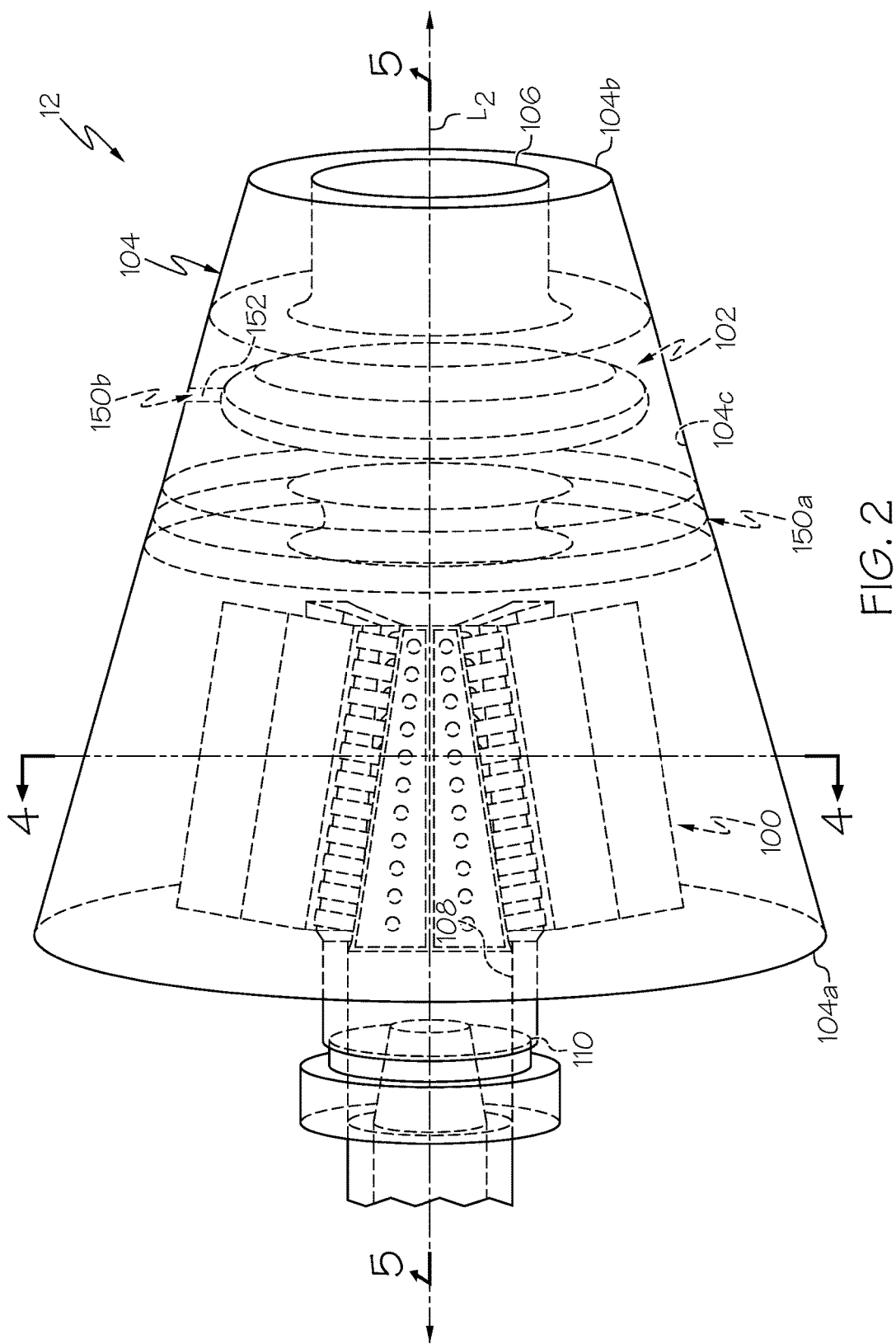
FIG. 2 is a perspective view of the exhaust system of FIG. 1.

The exhaust system 12 is in fluid communication with the primary fluid and the secondary fluid. The exhaust system 12 uses the energy of the primary fluid to draw the secondary fluid into an eductor stage or system 100, and further attenuates the sound generated by the gas turbine engine 10 in a muffler stage or system 102. In this embodiment, the exhaust system 12 attenuates the sound to about 3 dB to about 20 dB. The exhaust system 12 includes a housing 104 for the eductor system 100 and the muffler system 102. The eductor system 100, the muffler system 102 and the housing 104 extend along a longitudinal axis L2, which, in this example, is substantially parallel to the longitudinal axis L of the gas turbine engine 10. It should be noted, however, that the housing 104 need not be parallel to the longitudinal axis L. In certain embodiments, the housing 104 comprises a tail cone. As illustrated in FIG. 2, the housing 104 is cone-shaped, and defines an exhaust outlet 106 at a second, terminal end 104*b*. It should be noted, however, that the housing 104 need not be cone-shaped, but rather, the housing 104 can have any desired shape. The exhaust outlet 106 is generally coaxial with the longitudinal axis L2. The housing 104 is composed of a suitable metal or metal alloy, and in one example is composed of stainless steel. The housing 104 can be formed through a suitable manufacturing process, such as stamping, etc., and can be coupled together via one or more mechanical fasteners. The eductor system 100 is generally coupled to the housing 104 adjacent to a first end 104*a*, and the muffler system 102 is coupled to the housing 104 so as to be adjacent to the second, terminal end 104*b*.

The eductor system 100 is disposed upstream from the muffler system 102. The eductor system 100 is downstream from the turbine section 20 to receive the primary fluid through a primary inlet duct 108 and is downstream from the source of the secondary fluid 44 to receive the secondary fluid through a secondary inlet duct 110. Generally, the secondary inlet duct 110 surrounds at least a portion of the primary inlet duct 108, and each of the primary inlet duct 108 and the secondary inlet duct 110 are substantially annular. In one example, the primary inlet duct 108 and the secondary inlet duct 110 are coaxial. Each of the primary inlet duct 108 and the secondary inlet duct 110 are composed of a suitable metal or metal alloy, such as stainless steel.

With reference to FIG. 1, the eductor system 100 can be coupled to the housing 104 such that the eductor system 100 is generally suspended within a chamber 112 defined by the housing 104. In one example, the eductor system 100 is mechanically fastened to a portion of the primary inlet duct 108 and the secondary inlet duct 110 to enable the eductor system 100 to be suspended within the housing 104. It will be understood; however, that other configurations are possible. In one example, the eductor system 100 is composed of a metal or a metal alloy, including, but not limited to stainless steel. The eductor system 100 can be composed of multiple pieces, which are cast, stamped or machined, and assembled to define the eductor system 100. In this example, the multiple pieces can be coupled together via one or more mechanical fasteners, welding, etc. In other embodiments, the eductor system 100 can be formed through selective laser sintering, or other additive manufacturing techniques.

Figure 3:
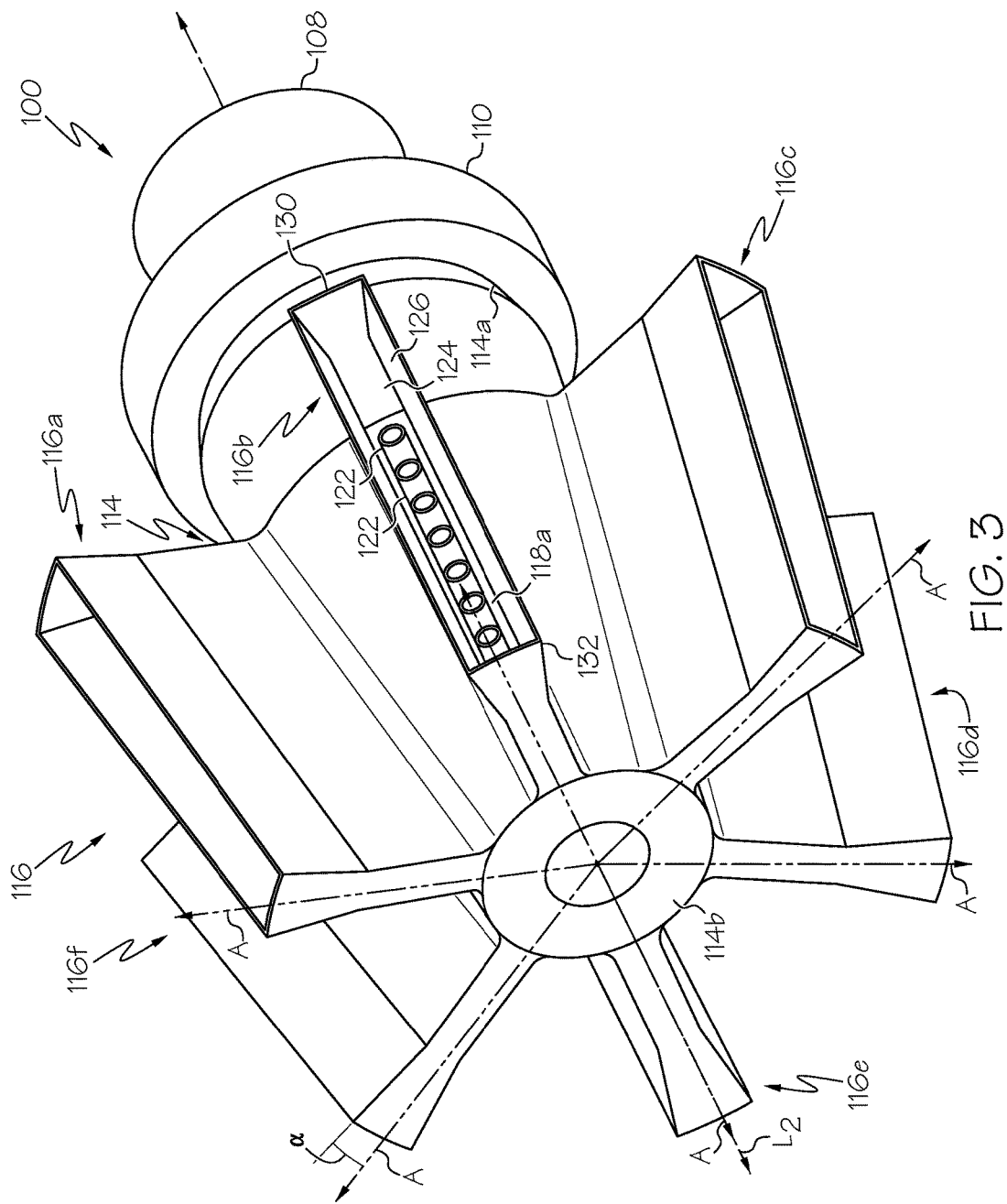
FIG. 3 is a perspective view of an eductor system of the exhaust system of FIG. 1.

With reference to FIG. 3, the eductor system 100 includes a body 114 and a plurality of ducts 116. The body 114 is substantially cylindrical, and can taper from a first end 114a to a second end 114b. In certain embodiments, the body 114 can have a substantially cone-like shape. The body 114 is in fluid communication with the primary inlet duct 108 and the secondary inlet duct 110 to receive the primary fluid and the secondary fluid, respectively.

Figure 4:
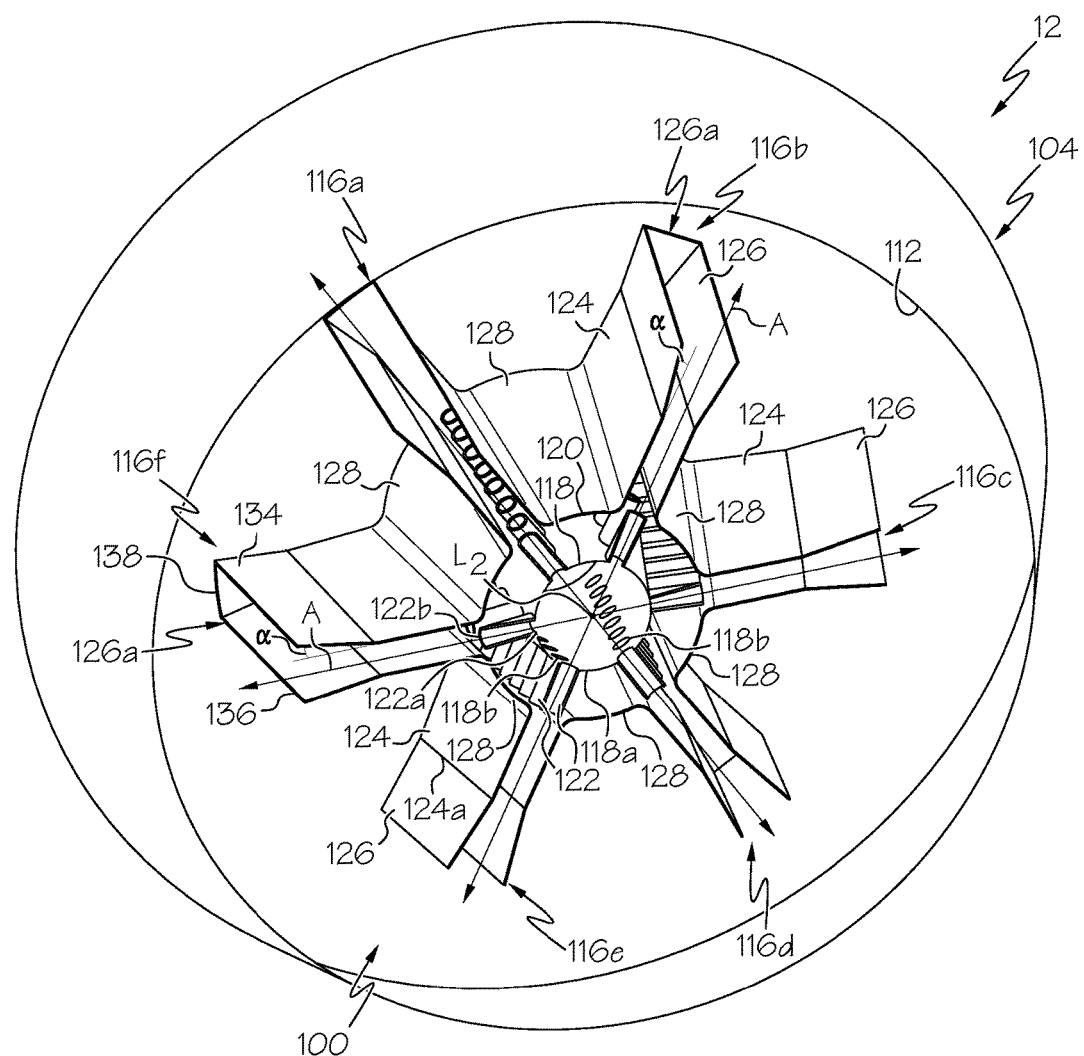
FIG. 4 is a cross-sectional view of the exhaust system of FIG. 2, taken along line 4-4 of FIG. 2.

With reference to FIG. 4, the body 114 includes a primary manifold 118 and a secondary plenum 120. The primary manifold 118 is in fluid communication with the primary inlet duct 108, and the secondary plenum 120 is in fluid communication with the secondary inlet duct 110. The primary manifold 118 is substantially coaxial with the secondary plenum 120, and is bounded by an annular wall 118a. The annular wall 118a directs the primary fluid from the primary inlet duct 108 into one of a plurality of eductor primary flow paths 122 associated with a respective one of the plurality of ducts 116. The secondary plenum 120 is defined at least partially by the annular wall 118a, which serves to direct the secondary fluid into a respective one of the plurality of ducts 116.

The plurality of ducts 116 are in fluid communication with the primary manifold 118 and the secondary plenum 120 to receive the primary fluid and the secondary fluid, respectively. In one example, the plurality of ducts 116 are spaced apart about a circumference of the body 114, and in this example, the plurality of ducts 116 are substantially symmetric with respect to the longitudinal axis L2. The plurality of ducts 116 include six ducts 116a-116f, however, it will be understood that while the eductor system 100 is described herein as comprising the plurality of ducts 116, the eductor system 100 can include a single duct 116, and moreover, the eductor system 100 can include any number of ducts 116, and thus, the six ducts 116a-116f are merely an example. With reference to FIG. 3, each of the ducts 116a-116f extend from the body 114 along an axis A, which is substantially transverse to the longitudinal axis L2. In this example, the longitudinal axis L2 can comprise a first axis, and the ducts 116a-116f can extend from the body 114 along the axis A, which comprises a second axis that is transverse to the first axis or longitudinal axis L2. Generally, the ducts 116a-116f extend radially outward from the body 114 and generate a radially directed mixed fluid flow M (i.e. the primary flow mixed with the secondary flow) into the muffler system 102.

Figure 5:
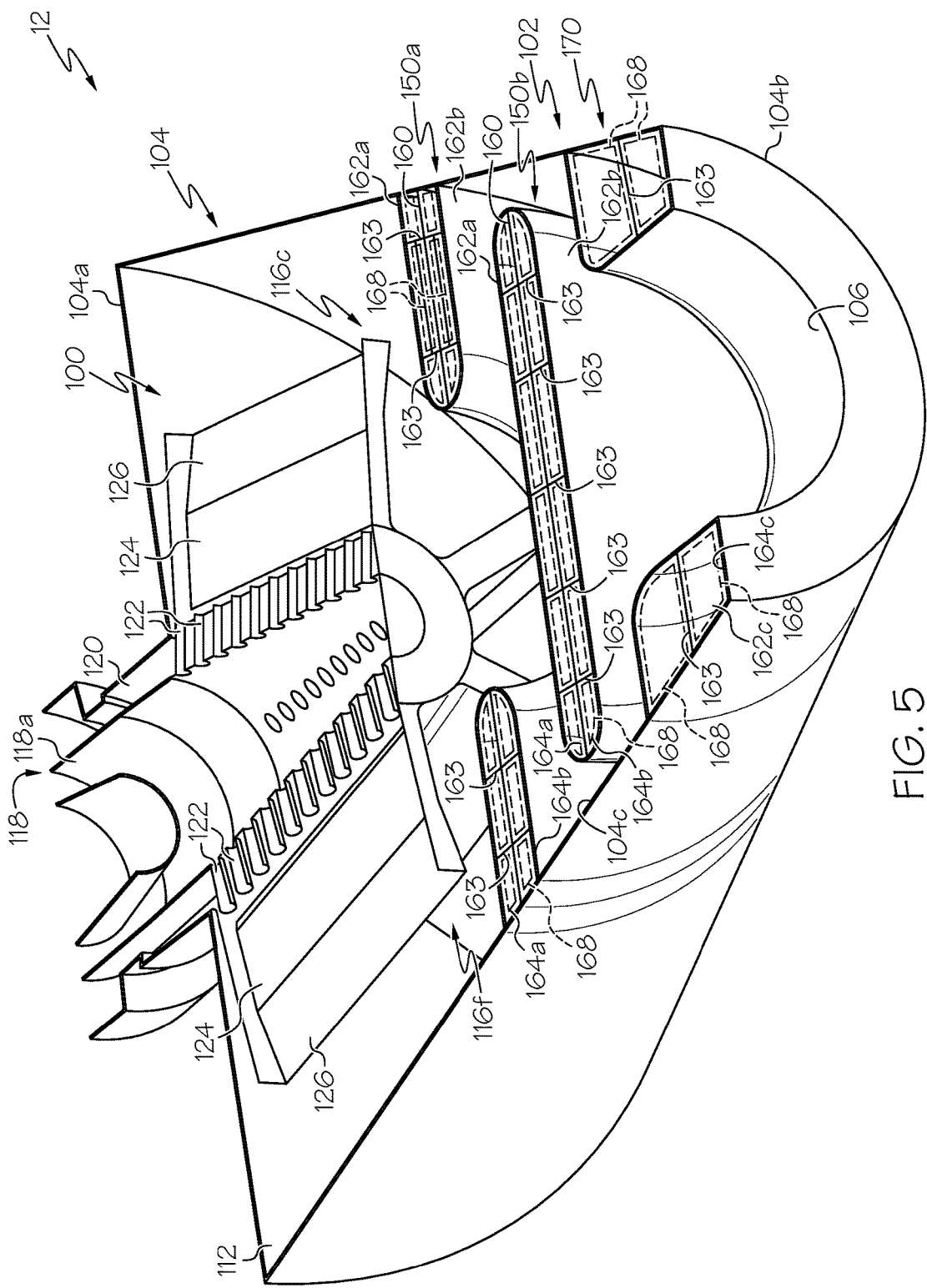
FIG. 5 is a cross-sectional view of the exhaust system of FIG. 2, taken along line 5-5 of FIG. 2.

With reference to FIG. 4, each of the ducts 116a-116f includes the plurality of eductor primary flow paths 122, a mixing chamber 124 and a diffuser section 126. Each of the ducts 116a-116f can be interconnected via an arcuate sidewall 128, which also aids in defining the secondary plenum 120. The plurality of eductor primary flow paths 122 terminate in the mixing chamber 124 and are in fluid communication with a respective bore 118b defined through the primary manifold 118 to receive the primary fluid. Generally, the primary manifold 118 includes a plurality of the bores 118b defined through the annular wall 118a, with one bore 118b associated with one of the plurality of eductor primary flow paths 122 to enable fluid communication between the primary manifold 118 and the plurality of eductor primary flow paths 122. With reference to FIG. 3, the plurality of eductor primary flow paths 122 are a plurality of cylindrical tubes defined within the respective duct 116a-116f that extend from a first end 130 to a second, opposite end 132 of the respective duct 116a-116f. Generally, the plurality of eductor primary flow paths 122 are spaced apart along the annular wall 118a from the first end 130 to the second end 132. In one example, the plurality of eductor primary flow paths 122 can comprise eleven eductor primary flow paths 122 as shown in FIGS. 2 and 5; however, the plurality of eductor primary flow paths 122 can comprise any number of eductor primary flow paths 122, and thus, the use of eleven is merely an example. While the plurality of eductor primary flow paths 122 are described herein as substantially cylindrical, it will be understood that the plurality of eductor primary flow paths 122 can have any desired shape.

With reference to FIG. 4, the plurality of eductor primary flow paths 122 generally extend from the annular wall 118a at a first end 122a and terminate in the mixing chamber 124 at a second end 122b. The first end 122a is coupled to the annular wall 118a at the respective bore 118b, and the second end 122b terminates at the mixing chamber 124. The plurality of eductor primary flow paths 122 are substantially perpendicular to the longitudinal axis L2, and are substantially circumferentially perpendicular to the annular wall 118a. As the plurality of eductor primary flow paths 122 pass through a portion of the secondary plenum 120, the cooling of the primary exhaust fluid or primary fluid is increased. In addition, the plurality of eductor primary flow paths 122 provides for an even distribution of the primary exhaust fluid or primary fluid, which can avoid locally increased velocity of the flow through the exhaust system 12. The plurality of eductor primary flow paths 122 also increases the contact perimeter between the primary flow path 40 and the secondary flow path 42, which increases the eduction of the flow of the secondary fluid via viscous action between the primary flow path 40 and the secondary flow path 42. This enables the secondary fluid to also cool the engine compartment and the fluid in the engine and generator oil cooler 46.

The mixing chamber 124 is in fluid communication with the secondary plenum 120 to receive the secondary fluid, and is in fluid communication with the plurality of eductor primary flow paths 122 to receive the primary fluid. The mixing chamber 124 mixes the primary fluid with the secondary fluid to create the mixed fluid flow M. The mixing chamber 124 generally extends from an area adjacent to the second ends 122b of the plurality of eductor primary flow paths 122 for a length sufficient to create the mixed fluid flow M. The mixing chamber 124 terminates at an end 124a coupled to the diffuser section 126.

The diffuser section 126 is coupled or defined downstream from the mixing chamber 124. The diffuser section 126 defines a flared outlet generally indicated by reference numeral 126a. In one example, the diffuser section 126 includes a first flared wall 134 and a second flared wall 136. The first flared wall 134 and the second flared wall 136 are interconnected by end portions 138. The first flared wall 134 and the second flared wall 136 generally diverges from the end 124a at an angle a, which is about 0 to about 10 degrees. The diffuser section 126 minimizes pressure losses, and further lowers the velocity of the mixed fluid flow M prior to the mixed fluid flow M exiting the eductor system 100. In this embodiment, the primary fluid flow P exits the primary flow paths 122 at a speed of about 0.1 Mach to about 0.3 Mach. With the mixed fluid flow M exiting the eductor system 100 at less than about 0.1 Mach, in combination with the diffuser section 126, which slows the mixed fluid flow M before entering the muffler system 102, the overall exhaust back pressure increase is about 1.0 percent to about 2.0 percent for the exhaust system 12 over a straight exhaust system.

With reference to FIG. 1, the muffler system 102 receives the mixed fluid flow (generally indicated by arrow M) from the eductor system 100. Given the shape of the chamber 112 of the housing 104, the mixed fluid flow M flows out of the diffuser section 126 of each of the ducts 116a-116f at substantially a ninety degree angle relative to the longitudinal axis L2. The muffler system 102 includes a plurality of baffles 150 that cooperate to define a tortuous path (generally indicated by arrow T) for the mixed fluid flow M, and the plurality of baffles 150 attenuate sound generated by the gas turbine engine 10. The airflow passage along the tortuous path T defined by the muffler system 102 is sized to maintain mean flow Mach numbers below about 0.2 to minimize noise generated by the mixed fluid flow M and to minimize pressure losses through the muffler system 102. In one example, the plurality of baffles 150 comprise two baffles 150a-150b, which are spaced apart near the second, terminal end 104b of the housing 104 to define the tortuous path T. It will be understood, however, that any number of baffles 150 in any desired configuration can be used to define the tortuous path T. Generally, the tortuous path T is defined so that there is not a line-of-sight through the muffler system 102. Thus, the "tortuous path" as referred to herein is a fluid flow path that has repeated twists, bends or turns in which there is no line-of-sight along the path.

With reference to FIG. 2, the baffle 150a is substantially torus-shaped, and the baffle 150b is substantially ellipsoid-shaped. Each of the baffle 150a and the baffle 150b are coupled to the housing 104. In this example, the baffle 150a is coupled to a sidewall 104c of the housing 104, while the baffle 150b is suspended from the sidewall 104c such that the space between the sidewall 104c and the baffle 150b defines a portion of the tortuous path T. In one example, the baffle 150b is suspended via one or more struts 152; however, any suitable technique can be employed to couple the baffle 150b to the housing 104.

With reference to FIG. 5, each of the baffles 150a, 150b include a mid-plane solid wall 160, and one or more perforated panels 162. The mid-plane solid wall 160 cooperates with the one or more perforated panels 162 to attenuate the sound generated by the gas turbine engine 10. Generally, each of the baffles 150a, 150b includes a first perforated panel 162a substantially opposite a second perforated panel 162b. The perforated panels 162 are generally defined on the baffles 150a, 150b so as to be in direct contact with the mixed fluid flow M that flows through the tortuous path T and to noise propagating from the gas turbine engine 10. In one example, the mid-plane solid wall 160 and the perforated panels 162 cooperate to define one or more acoustic chambers 164. The perforated panels 162 enable the noise from the gas turbine engine 10 to pass into a bulk acoustic material 168 contained wholly within the one or more acoustic chambers 164. Generally, each of the baffles 150a, 150b form two acoustic chambers 164a, 164b; however, with the addition of walls 163 oriented perpendicular to the baffles 150a, 150b any number of acoustic chambers 164 can be defined. It should be noted that the walls 163 are optional, and that if included, the walls 163 comprise solid walls.

In one example, the mid-plane solid wall 160, the perforated panels 162 and the walls 163 are each composed of a metal or metal alloy, including, but not limited to, stainless steel, Inconel, etc. The mid-plane solid wall 160, the perforated panels 162 and the walls 163 can be formed separately, via casting, stamping, etc. and coupled together through a suitable technique, such as one or more mechanical fasteners, welding, etc. The perforations in the perforated panels 162 can be defined in a suitable post processing step, via machining, punching, etc. The perforated panels 162 can define any number of perforations having any desired size and shape. In one example, the perforated panels 162 comprise a plurality of circular holes, which have an open area of about 3.0 percent to about 10 percent. It should be noted, however, that the perforated panels 162 can be composed of a fine wire mesh panel or screen, or a sintered wire material with or without a perforate backing. Thus, the perforated panels 162 can be considered porous panels, in that either the panel includes a plurality of perforations or openings (in the example of a wire mesh screen) through which the mixed fluid flow may pass.

The bulk acoustic material 168 substantially fills a volume defined by each of the acoustic chambers 164a, 164b. The bulk acoustic material 168 comprises any suitable acoustic material, including, but not limited to, open cell fiberglass foam. Generally, a sheet of the bulk acoustic material 168 is cut to form a plurality of bulk acoustic material inserts which are sized to fit within the acoustic chambers 164a, 164b and the bulk acoustic material inserts are inserted into the acoustic chambers 164a, 164b during assembly of the baffles 150a, 150b. It should be noted, however, that one or more of the acoustic chambers 164a, 164b can be left empty or devoid of the bulk acoustic material 168, if desired.

It should be noted that a portion 170 of the housing 104 about the exhaust outlet 106 can also be configured to attenuate sound. In this example, the portion 170 includes a perforated panel 162c, and cooperates with the sidewall 104c of the housing 104 to define an acoustic chamber 164c for receipt of the bulk acoustic material 168. The portion 170 can optionally include one or more of the walls 163, to define additional acoustic chambers 164c, as desired.

In order to attenuate the sound generated by the gas turbine engine 10, with reference to FIG. 1, the intake section 14, the compressor section 16, the combustor section 18, the turbine section 20 and the exhaust section 22 assembled and coupled together, the eductor system 100 can be assembled and coupled together. In one non-limiting example, the body 114 is formed so as to define the primary manifold 118 and the secondary plenum 120. The plurality of eductor primary flow paths 122 are each coupled to the primary manifold 118, and the plurality of ducts 116 are assembled about the body 114 and the plurality of eductor primary flow paths 122. With the eductor system 100 assembled, the eductor system 100 is coupled to the exhaust section 22 such that the primary inlet duct 108 is in fluid communication with the primary manifold 118, and the secondary inlet duct 110 is in fluid communication with the secondary plenum 120. The baffle 150a and the baffle 150b can be coupled to the housing 104, and the housing 104 can be coupled about the eductor system 100. Generally, each baffle 150a, 150b is assembled with the bulk acoustic material 168 received within each of the desired acoustic chambers 164 prior to coupling the baffles 150a, 150b to the housing 104. The housing 104 can be coupled about the eductor system 100 so as to substantially surround the eductor system 100, and thus, wholly contain the eductor system 100 and the muffler system 102 within the housing 104. In certain embodiments, the housing 104 can be coupled to a shroud associated with the exhaust section 22 to couple the housing 104 to the gas turbine engine 10.

With the exhaust system 12 assembled, upon a start-up of the gas turbine engine 10 via a controller, for example, a combination starter/generator can supply power to drive the shaft 26. The rotation of the shaft 26 drives the compressor 32 to draw air in via the inlet duct of the intake section 14. The compressor 32 compresses the air from the inlet duct, and directs the compressed air to the combustor 34. The compressed air mixes with fuel in the combustor 34 and is combusted to create the high-energy combustive gases. The combustive gases exit the combustor section 18, and expand through turbine 38. The gases from the turbine 38, which comprises the primary exhaust flow P, enters the primary flow duct 40 of the exhaust section 22. With reference to FIG. 4, the primary exhaust flow P flows from the primary flow duct 40 into the primary inlet duct 108. The primary exhaust flow P flows through the primary inlet duct 108 to the primary manifold 118. From the primary manifold 118, the primary exhaust flow P is directed into respective ones of the plurality of eductor primary flow paths 122.

With reference to FIG. 1, the primary exhaust flow P draws the secondary fluid flow S from the source of the secondary fluid 44 into the secondary flow duct 42 via viscous action. The secondary fluid flow S flows through the engine and generator oil cooler 46, thereby cooling the hydraulic fluid contained within or associated with the engine and generator oil cooler 46. The secondary fluid flow S flows from the engine and generator oil cooler 46 to the secondary inlet duct 110. From the secondary inlet duct 110, the secondary fluid flow S flows into the secondary plenum 120 (FIG. 4), and flows over the plurality of eductor primary flow paths 122.

With reference to FIG. 4, from the secondary plenum 120, the secondary fluid flow S enters the mixing chamber 124 and mixes with the primary exhaust fluid P that exits the plurality of eductor primary flow paths 122. The mixing chamber 124 creates the mixed fluid flow M, which cools the temperature of the primary exhaust fluid P. The mixed fluid flow M flows into the respective diffuser sections 126, where the speed of the mixed fluid flow M is reduced, before exiting the respective one of the ducts 116a-116f.

With reference to FIG. 1, the mixed fluid flow M exits the ducts 116a-116f, and the mixed fluid flow M follows the tortuous path T defined by the muffler system 102. In this example, the mixed fluid flow M turns about 90 degrees relative to the flared outlet 126a of the respective diffuser sections 126 in order to pass through the baffle 150a. The perforated panels 162 and the bulk acoustic material 168 of the baffle 150a cooperate to attenuate the sound generated by the operation of the gas turbine engine 10. The mixed fluid flow M flows through an opening 151 defined through the center of the torus-shaped baffle 150a, and flows about a perimeter or circumference 153 of the ellipsoid-shaped baffle 150b. The perforated panels 162 and the bulk acoustic material 168 of the baffle 150b also cooperate to attenuate the sound generated by the operation of the gas turbine engine 10. From the baffle 150b, the mixed fluid flow M flows past the portion 170 prior to exiting the housing 104 at the exhaust outlet 106. The perforated panels 162 and the bulk acoustic material 168 of the portion 170 cooperate to further attenuate the sound generated by the operation of the gas turbine engine 10.

Figure 6:
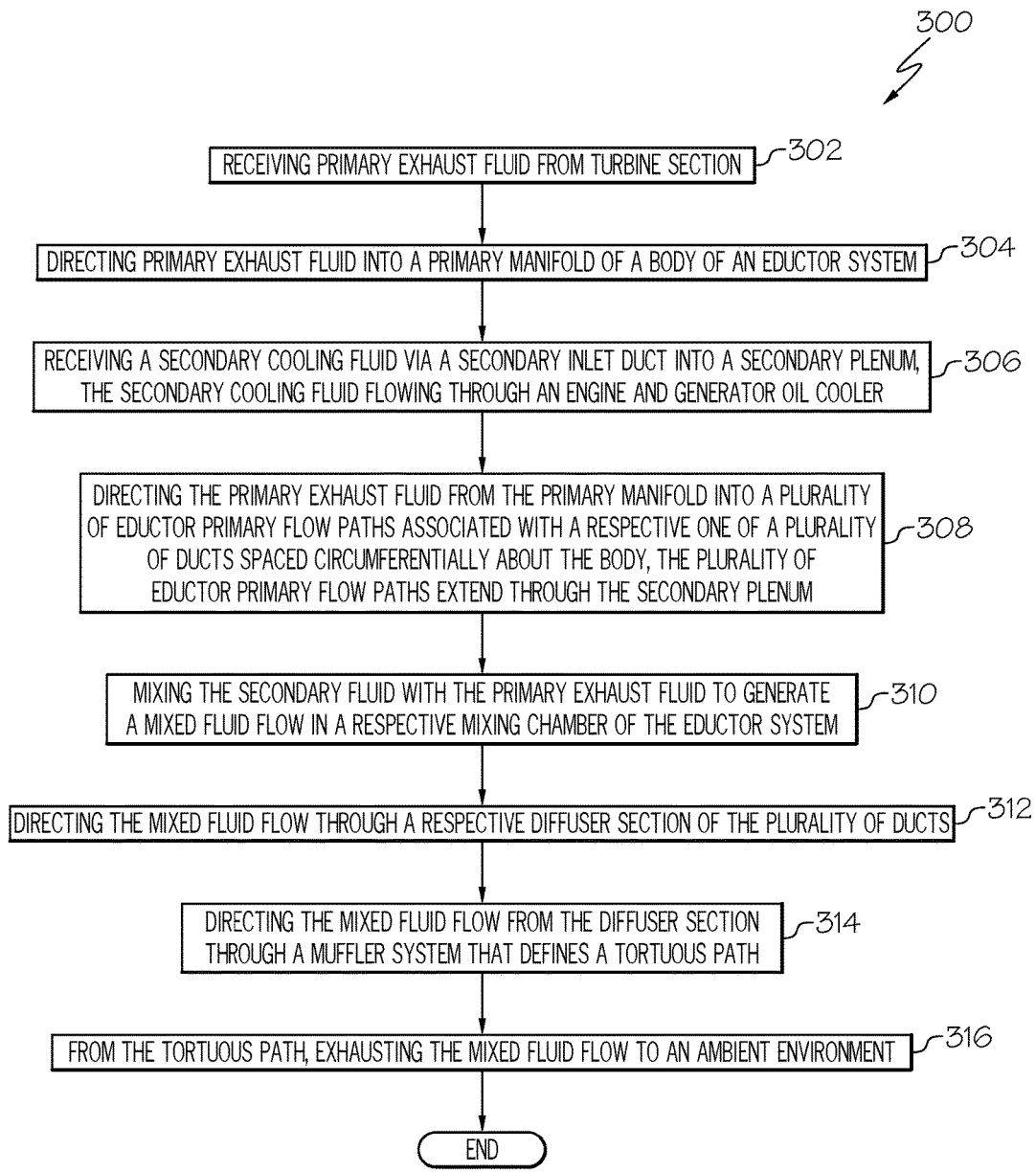
FIG. 6 is a method for exhausting gas generated by the gas turbine engine with the exhaust system of FIG. 1.

Thus, with reference to FIG. 6, a method 300 for attenuating sound generated by a gas turbine engine 10 is shown. At 302, the primary exhaust fluid P is received from the turbine section 20 of the gas turbine engine 10. At 304, the primary exhaust fluid P is directed into the primary manifold 118 of the eductor system 100. At 306, the secondary cooling fluid or the secondary fluid flow S is received or drawn in through the secondary inlet duct 110, with the received secondary cooling fluid or secondary fluid flow S drawn through the engine and generator oil cooler 46 to cool the engine and generator oil cooler 46. At 308, the primary exhaust fluid P is directed from the primary manifold 118 into the plurality of eductor primary flow paths 122 of the eductor system 100, with the plurality of eductor primary flow paths 122 extending through the secondary plenum 120 and the plurality of eductor primary flow paths 122 spaced circumferentially about the primary manifold 118. Stated another way, at 308, the primary exhaust fluid P is directed through the plurality of eductor primary flow paths 122 associated with a respective one of the plurality of ducts 116 spaced circumferentially about the primary manifold 118 of the body 114, with the plurality of eductor primary flow paths 122 extending through the secondary plenum 120.

At 310, the secondary cooling fluid or secondary fluid flow S is mixed with the primary exhaust fluid P to generate the mixed fluid flow M in a respective one of the mixing chambers 124 of the ducts 116a-116f. At 312, the mixed fluid flow M is directed through a respective diffuser section 126 of the eductor system 100. At 314, the mixed fluid flow M is directed from the diffuser sections 126 though the muffler system 102, which defines the tortuous path T. At 316, the mixed fluid flow M is exhausted through the tortuous path T into an ambient environment surrounding the aircraft 8 via the exhaust outlet 106.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the disclosure in any way. Rather, the foregoing detailed description will provide those skilled in the art with a convenient road map for implementing the exemplary embodiment or exemplary embodiments. It should be understood that various changes can be made in the function and arrangement of elements without departing from the scope of the disclosure as set forth in the appended claims and the legal equivalents thereof.

What is claimed is:

1. An exhaust system for a gas turbine engine, comprising:

an eductor system adapted to receive a primary exhaust fluid, the eductor system including a body that extends along a first axis, with a plurality of ducts spaced apart about a circumference of the body, and each of the plurality of ducts extend from the body along a second axis transverse to the first axis to define a plurality of eductor primary flow paths that terminate in a mixing chamber, and the mixing chamber is adapted to receive a secondary cooling fluid and to mix the primary exhaust fluid with the secondary cooling fluid to create a mixed fluid flow; and a muffler system downstream from the mixing chamber adapted to receive the mixed fluid flow from the eductor system, the muffler system including a plurality of baffles that cooperate to define a tortuous path for the mixed fluid flow and attenuate sound generated by the gas turbine engine, wherein the plurality of baffles comprise a first torus-shaped baffle, and a second ellipsoid-shaped baffle, and the tortuous path is defined through an opening of the first baffle and about a perimeter of the second baffle.

2. The exhaust system of claim 1, wherein the plurality of baffles include at least one porous panel and a solid wall that cooperate to define at least one acoustic chamber.

3. The exhaust system of claim 1, wherein each of the plurality of ducts include a diffuser section in fluid communication with the mixing chamber.

4. The exhaust system of claim 1, wherein the body includes a primary manifold in fluid communication with a source of the primary exhaust fluid to receive the primary exhaust fluid and a secondary plenum in fluid communication with a source of the secondary cooling fluid to receive the secondary cooling fluid, and the secondary plenum surrounds the primary manifold.

5. The exhaust system of claim 4, wherein the plurality of eductor primary flow paths extend from the primary manifold to the mixing chamber, and the plurality of eductor primary flow paths extend at least partially through the secondary plenum.

6. The exhaust system of claim 1, further comprising an engine and generator oil cooler, and the secondary fluid is drawn through the engine and generator oil cooler to be received in the eductor system.

7. The exhaust system of claim 4, wherein the plurality of eductor primary flow paths are defined by a plurality of cylindrical tubes that have a first end in fluid communication with a respective bore defined through the primary manifold, and the plurality of cylindrical tubes have a second end, opposite the first end, that terminates in the mixing chamber.

8. An exhaust system for a gas turbine engine, comprising:
an eductor system adapted to receive a primary exhaust fluid, the eductor system including a plurality of ducts spaced apart about a circumference of the eductor system, each of the plurality of ducts including a plurality of eductor primary flow paths that terminate in a mixing chamber, the mixing chamber adapted to receive a secondary cooling fluid and to mix the primary exhaust fluid with the secondary cooling fluid to create a mixed fluid flow; and
a muffler system downstream from the mixing chamber adapted to receive the mixed fluid flow from the eductor system, the muffler system including a plurality of baffles that cooperate to define a tortuous path for the mixed fluid flow and attenuate sound generated by the gas turbine engine,
wherein the plurality of baffles comprise a first torus-shaped baffle, and a second ellipsoid-shaped baffle, and the tortuous path is defined through an opening of the first baffle and about a perimeter of the second baffle.

9. The exhaust system of claim 8, wherein the plurality of baffles include at least one perforated panel and a solid wall that cooperate to define at least one acoustic chamber, with an acoustic material received within the at least one acoustic chamber.

10. The exhaust system of claim 8, wherein each of the plurality of ducts include a diffuser section in fluid communication with the mixing chamber.

11. The exhaust system of claim 8, wherein the eductor system includes a body that extends along a first axis, with the plurality of ducts coupled to the body and spaced apart about a circumference of the body, and each of the plurality of ducts extend from the body along a second axis, the second axis transverse to the first axis.

12. The exhaust system of claim 11, wherein the body includes a primary manifold in fluid communication with a source of the primary exhaust fluid to receive the primary exhaust fluid and a secondary plenum in fluid communication with a source of the secondary cooling fluid to receive the secondary cooling fluid, and the secondary plenum surrounds the primary manifold.

13. The exhaust system of claim 12, wherein the plurality of eductor primary flow paths extend from the primary manifold to the mixing chamber, and the plurality of eductor primary flow paths extend at least partially through the secondary plenum.

* * * * *